United States Patent [19]

Debrabander

[11] Patent Number: 5,248,018
[45] Date of Patent: Sep. 28, 1993

[54] HIGH TEMPERATURE DISENGAGING FLUID COUPLING

[75] Inventor: James R. Debrabander, Battle Creek, Mich.

[73] Assignee: Eaton Corporation, Cleveland, Ohio

[21] Appl. No.: 965,122

[22] Filed: Oct. 22, 1992

[51] Int. Cl.$^5$ .................... F16D 35/02; F16D 43/25
[52] U.S. Cl. .................... 192/58 B; 192/82 T
[58] Field of Search ................ 192/58 B, 82 T

[56] References Cited

U.S. PATENT DOCUMENTS

| | | | |
|---|---|---|---|
| 3,363,734 | 11/1968 | Sabat | 192/58 B |
| 3,587,801 | 6/1971 | Riner | 192/82 T X |
| 4,051,936 | 10/1977 | Crisenbery et al. | 192/58 B |
| 4,469,209 | 9/1984 | Hayashi et al. | 192/82 T X |
| 4,502,580 | 3/1985 | Clancey | 192/58 B |
| 4,606,445 | 8/1986 | Rockey | 192/58 B |
| 4,662,495 | 5/1987 | Brunken | 192/58 B |
| 4,974,712 | 12/1990 | Brown | 192/58 B |

Primary Examiner—Richard M. Lorence
Attorney, Agent, or Firm—L. J. Kasper

[57] ABSTRACT

A fluid coupling device is described of the type defining a fluid chamber divided by a valve plate (29) into a fluid operating chamber (31) and a fluid reservoir chamber (33). The valve plate defines a fluid inlet (55) and a discharge opening (51). Flow of fluid between the chambers (31) and (33) is controlled by a valve member (41) including first (57) and second (59) inlet covering portions, and a discharge covering portion (61). The valve member is controlled normally in response to external ambient air temperature, by means of a bimetal coil (43). When input speed to the coupling device becomes extremely high, slip speed increases, thus increasing the fluid temperature within the coupling. This additional heat causes the bimetal coil (43) to move the valve arm to a disengaged position (FIG. 4) in which the fluid inlet (55) is once again covered, and the discharge opening (51) is again uncovered, permitting the coupling device to operate in a disengaged mode.

6 Claims, 3 Drawing Sheets

HIGH TEMPERATURE DISENGAGING FLUID COUPLING

BACKGROUND OF THE INVENTION

The present invention relates to fluid coupling devices, and more particularly, to such devices which are capable of changing between the engaged and disengaged conditions, in response to variations in a predetermined temperature condition.

A fluid coupling device of the type to which the present invention relates typically includes an input coupling member and an output coupling member. The output coupling member cooperates with a cover assembly to define a fluid chamber and a valve plate separates the chamber into a reservoir chamber and an operating chamber. The input coupling member is rotatably disposed in the operating chamber, and cooperates with the output coupling member to define a viscous shear space, such that torque may be transmitted from the input member to the output member by means of a viscous shear fluid.

The valve plate includes a valving arrangement operable in response to variations in ambient air temperature to permit fluid to flow from the reservoir, through a fill opening defined by the valve plate, into the operating chamber. Typically, such fluid couplings include a discharge port defined by the valve plate and disposed near the outer periphery of the operating chamber, with some form of pumping element, such that a small quantity of fluid is pumped from the operating chamber back to the reservoir chamber during normal operation.

With the advent of smaller automobile engines, operating at relatively higher speeds and temperatures, it becomes increasingly common for the temperature of the fluid in the coupling device to exceed a predetermined maximum temperature. When this occurs, the silicone fluid typically used in such coupling devices undergoes a process in which the fluid first "droops", i.e., there is a physical breakdown of the polymer chains such that the fluid viscosity decreases and the torque transmitting capabilities of the device decreases substantially. Then, with continued excess fluid temperature, the fluid again begins to cross-link, but does so excessively, and eventually "gels" or becomes almost solid. When the fluid reaches this condition, the coupling device operates as if it were solid, with no slip speed in the engaged mode, and no capability of operating in a disengaged mode.

Those skilled in the art have attempted to overcome the problems described above by various means. U.S. Pat. No. 4,662,495 discloses a fluid coupling device having an IBM (internal bimetal) which responds to internal fluid temperature, and acts independently of the normal, external bimetal which senses ambient air temperature. As the internal fluid temperature exceeds a predetermined maximum, the IBM is configured to overcome the normal springiness of the axial valve arm, and move the valve arm from an open position (displaced away from the valve plate and the fill port) back toward the valve plate, covering the fill port. Although the device of the invention would theoretically operate satisfactorily, the provision of an additional bimetal element, within the fluid coupling device, adds substantially to the manufacturing cost and complexity of the device, as well as adding cost and complexity to the assembly and testing procedures required. Furthermore, although the addition of an IBM is suitable for use with an axially movable valve arm, an IBM is not especially suited for use with a rotary valve arm of the type which is fixed relative to the inner end of a bimetal coil, by means of a valve shaft.

SUMMARY OF THE INVENTION

Accordingly, it is an object of the present invention to provide a fluid coupling device of the type described, including means to prevent overheating and damage of the viscous fluid.

It is a more specific object of the present invention to provide a fluid coupling device which accomplishes the above-stated object by preventing filling of the fluid operating chamber whenever the fluid temperature reaches a predetermined maximum.

DESCRIPTION OF THE PREFERRED EMBODIMENT

Figure 1:
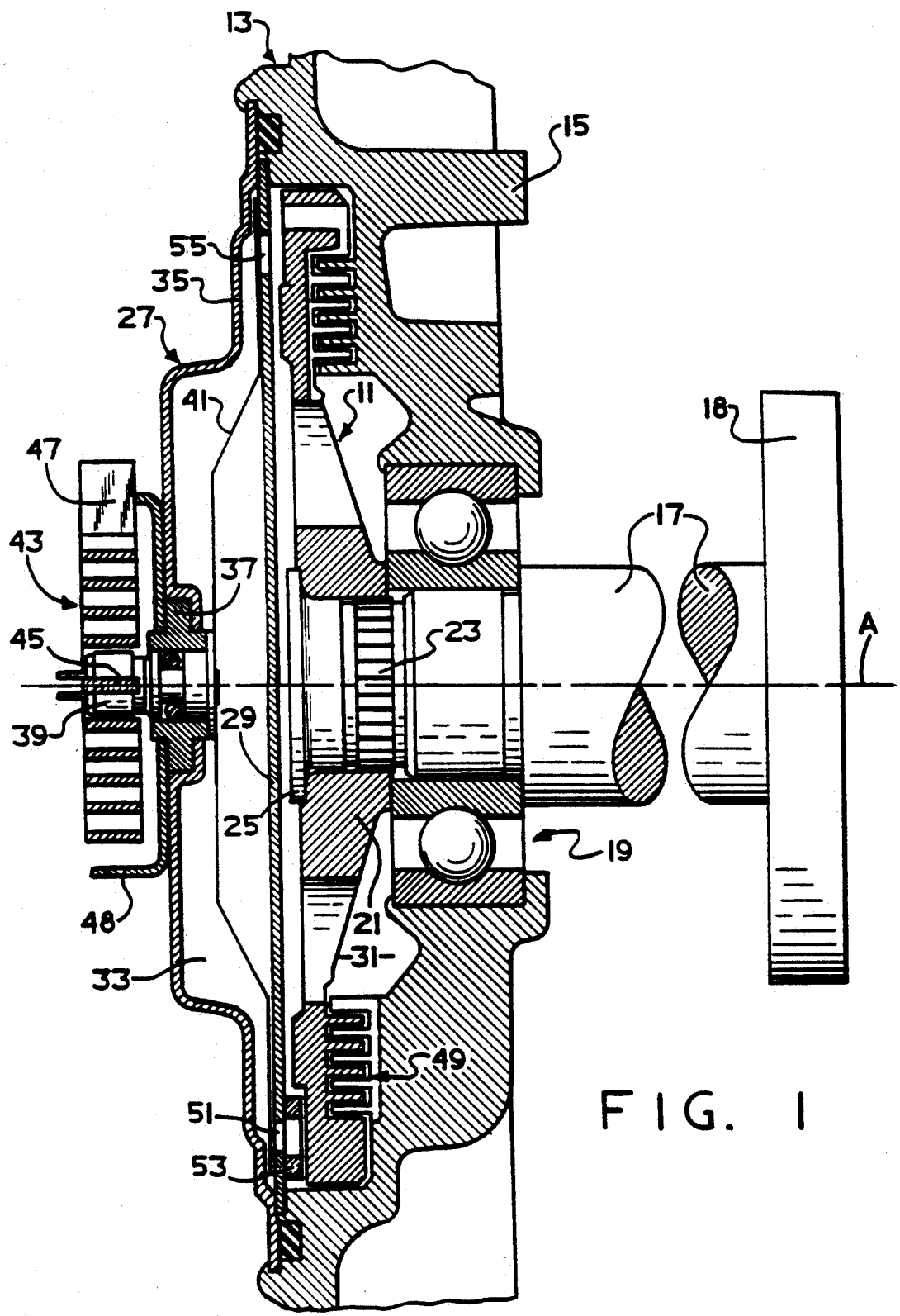
FIG. 1 is an axial cross-section of a typical fluid coupling device of the type which may utilize the present invention.

Referring now to the drawings, which are not intended to limit the invention, FIG. 1 illustrates a preferred form of a fluid coupling device, of the type with which the present invention may advantageously be utilized. The fluid coupling device includes an input coupling member 11, and an output coupling assembly 13. The fluid coupling may be used as a drive for an automotive engine accessory, and specifically, as a drive for a radiator cooling fan. The fan (not shown herein) may be bolted to the output coupling assembly 13 by means of a plurality of bolts and threaded bores (not shown herein) formed in the assembly 13. It will be understood, however, that the use of the present invention is not limited to any particular fluid coupling configuration, or application, except to the extent set forth hereinafter in the appended claims.

The fluid coupling assembly 13 includes a coupling body 15, which may also be referred to as the "output coupling member". The fluid coupling further includes an input shaft 17, on which input member 11 is mounted, and which is rotatably driven, typically by means of a flange 18, which may be bolted to the flange of a water pump (not shown herein). The input shaft 17 functions as a support for the inner race of a bearing set 19, which is seated on the inside diameter of the output coupling member 15.

The input coupling member 11 is in the form of a disc, having a hub portion 21 supported by the forward end of the shaft 17. The hub portion 21 has an opening therethrough, which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25, to retain positively the input coupling member 11 on the shaft 17, such that rotation of the shaft 17 causes rotation of the input coupling member 11.

The output coupling member 15 cooperates with a cover assembly, generally designated 27, to define a fluid chamber therebetween, the fluid chamber being separated by a valve plate 29 into a fluid operating chamber 31 and a fluid reservoir chamber 33.

Included within the cover assembly 27 is a stamped cover member 35 defining a central aperture which receives a generally cylindrical insert member 37. Rotatably disposed within the insert member 37, and supported thereby, is a valve shaft 39 extending "outwardly" (to the left in FIG. 1) through the cover member 35. Attached to the inner end of the valve shaft 39 is a valve arm 41, the general construction and operation of which may be better understood by reference to U.S. Pat. Nos. 3,055,473 and U.S. Pat. No. 4,974,712.

Referring still to FIG. 1, the cover assembly 27 further includes a bimetal element, generally designated 43 which, in the subject embodiment, is formed in the shape of a spiral coil, and includes an inner end portion 45 received within a slot formed in the outer end of the valve shaft 39. The bimetal coil 43 also includes an outer end portion 47 which, typically, is fixed relative to the cover member 35 by suitable attachment means, such as a bracket 48. Further understanding of the attachment of the inner and outer ends of the coil 43 may be gained by reference to U.S. Pat. No. 4,735,300, assigned to the assignee of the present invention and incorporated herein by reference.

Referring still to FIG. 1, the rearward (to the right in FIG. 1) surface of the input coupling 11 cooperates with an adjacent, forward surface of the output coupling member 15 to form a plurality of annular, interdigitated lands and grooves, generally designated 49, which define therebetween a viscous shear area. The viscous shear area, which also will bear the reference numeral 49 hereinafter, is operable, when filled with appropriate viscous fluid, to transmit torque from the input coupling 11 to the output coupling 15, by means of viscous shear drag, as is well known to those skilled in the art. It should be understood, however, that the present invention is not limited to any particular configuration of lands and grooves, or any particular type or configuration of viscous shear space.

Figure 2:
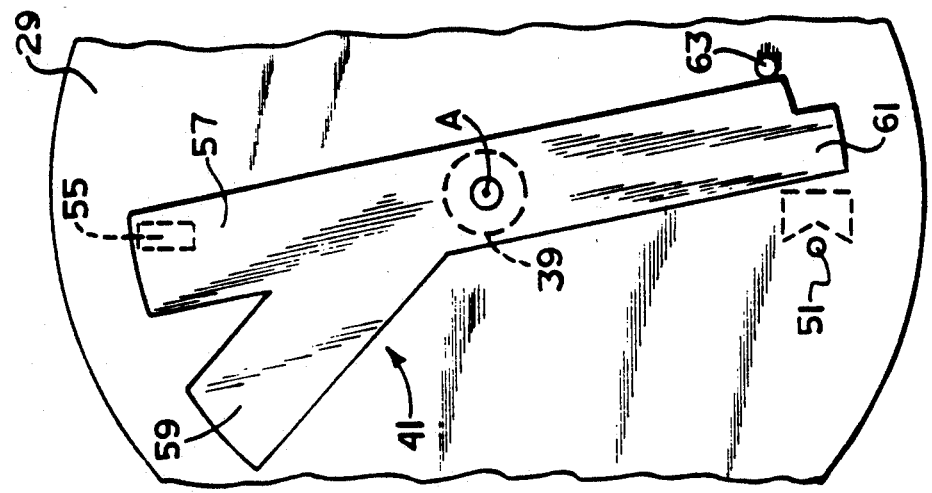
FIG. 2 is a fragmentary, somewhat schematic plan view of the valve plate and valve arm, shown in the normal disengaged mode.

Referring now primarily to the lower half of FIG. 1, the valve plate 29 defines a discharge opening 51, and disposed adjacent the opening 51, and on the rearward side of the valve plate 29, is a pumping element (wiper) 53 (see also FIG. 2). As is well known to those skilled in the art, the wiper 53 is operable to engage the relatively rotating fluid in the operating chamber 31, adjacent the outer periphery of the input coupling 11, and to generate a localized region of relatively higher fluid pressure. Thus, the wiper 53 is able to pump a small quantity of fluid back into the reservoir chamber 33, through the opening 51.

Referring now primarily to the upper half of FIG. 1, valve plate 29 further defines a fill opening 55, through which fluid is able to flow from the reservoir chamber 33 into the operating chamber 31, whenever the bimetal coil 43 senses an ambient temperature condition indicating the need for operation of the coupling device in the engaged mode, i.e., the need for operation of the radiator cooling fan. In general, the operation of the bimetal coil 43 to rotate the valve shaft 39 and control the position of the valve arm 41 is well known to those skilled in the art, being in widespread commercial use.

Figure 4:
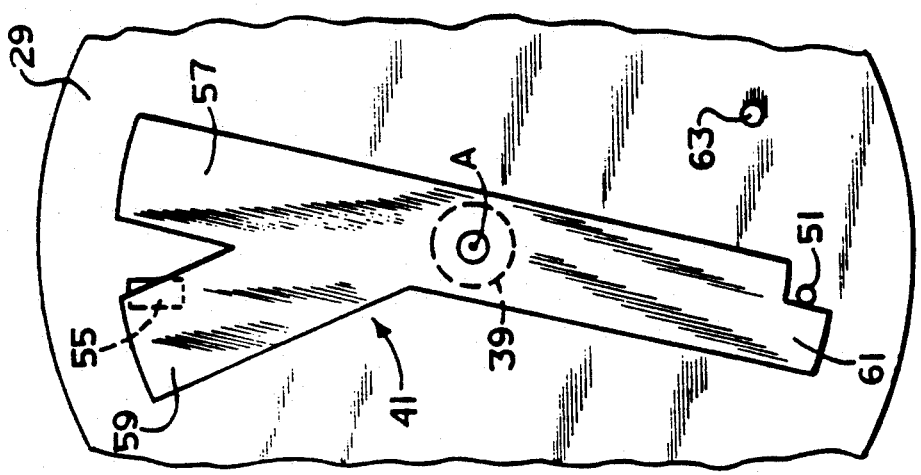
FIG. 4 is a fragmentary, somewhat schematic view, similar to FIGS. 2 and 3, illustrating the valve arm in the high temperature, disengaged mode.
Figure 3:
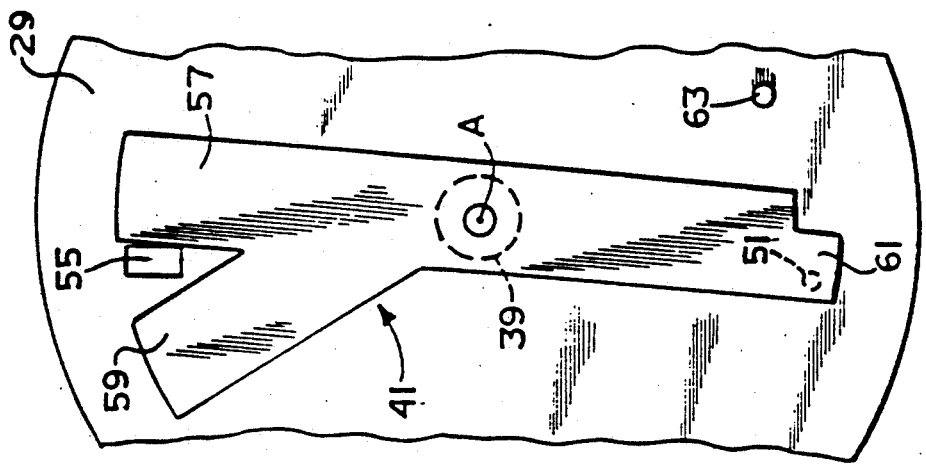
FIG. 3 is a fragmentary, somewhat schematic view, similar to FIG. 2, but with the valve arm in the normal, engaged mode.

FIGS. 2 through 4—Valving

Referring now primarily to FIGS. 2 through 4, the valve arm 41 of the present invention, and its operation at various ambient temperature conditions, will be described in some detail. The valve arm, generally designated 41, is generally Y-shaped, and includes a first port covering portion 57 and a second port covering portion 59. The valve arm 41 also includes a discharge covering portion 61, which is disposed in engagement with a "cold stop" 63, with the valve arm 41 in the position shown in FIG. 2, the cold stop 63 preventing any further counter-clockwise rotation of the valve arm 41, even as the ambient temperature drops below a predetermined minimum.

The position of the valve arm 41 shown in FIG. 2 corresponds to the minimum temperature condition for which no operation of the cooling fan is required, and therefore, the coupling device can operate in the disengaged mode. Thus, the fill opening 53 is covered by the first covering portion 57, preventing flow of fluid from the reservoir chamber 33 into the operating chamber. At the same time, the discharge opening 51 is uncovered by the discharge portion 61, so that any fluid in the operating chamber 31 will be pumped out by the wiper 53, returning to the reservoir chamber 33.

Referring now to FIG. 3, with increasing ambient temperature at the bimetal coil, indicating a need for operation of the radiator cooling fan, the valve arm 41 rotates clockwise from the position shown in FIG. 2 to the position shown in FIG. 3. By way of example only, the position shown in FIG. 2 may represent an ambient temperature of about 180 degrees Fahrenheit at the bimetal coil 43, whereas the position shown in FIG. 3 would represent a temperature of about 220 degrees Fahrenheit. With the valve arm 41 in the position shown in FIG. 3, the first covering portion 57 has now moved to a position uncovering the fill opening 55, such that fluid may flow from the reservoir chamber 33, through the opening 55, into the operating chamber 31. At the same time, the discharge portion 61 has moved to a position covering the discharge opening 51, thus preventing fluid from being pumped out of the operating chamber 31 and back into the reservoir chamber 33. Thus, at the temperature condition illustrated in FIG. 3, the fluid coupling device is operating in its normal, engaged mode.

It should be noted that one important aspect of the present invention is the recognition that, as the temperature of the fluid in the operating chamber 31 and the temperature of the fluid in the reservoir chamber 33 increases, there is a good correlation between the temperature of the fluid and the temperature of the bimetal coil 43. In fact, in the course of the development of the present invention, it has been found that the correlation was such that no additional bimetallic elements, such as the internal bimetals of the prior art, are needed, in order to accomplish the objectives of the invention (see FIG. 5, which will be described in greater detail subsequently).

Referring now primarily to FIG. 4, as the vehicle engine operates at higher and higher speeds, the "slip speed" (i.e., the difference between the speed of rotation of the input coupling 11 and the output coupling 15) continues to increase, adding energy in the form of heat to the viscous fluid in the shear space 49. As is well known to those skilled in the art, at relatively high vehicle speeds, there is typically sufficient "ram" air flowing through the radiator such that operation of the cooling fan is not required, and the ambient air surrounding the bimetal coil 43 would not typically indicate a need for cooling. However, as the slip speed increases and the viscous fluid is further heated, heat is transmitted through the cover member 35, insert 37, and valve shaft 39, to the bimetal coil 43, causing rotation of the valve arm 41 from the position shown in FIG. 3 toward the position shown in FIG. 4, and somewhat beyond.

As the valve arm 41 approaches the position shown in FIG. 4, the second covering portion 59 begins to cover the fill opening 55, thus restricting, and then blocking flow of fluid from the reservoir chamber 33 into the operating chamber 31. At the same time, the discharge portion 61 has moved past the discharge opening 51 such that fluid may again be pumped from the operating chamber 31 through the opening 51 into the reservoir chamber 33. Thus, when the high internal fluid temperature causes the bimetal coil 43 to move the valve arm 41 to the position shown in FIG. 4, the fluid coupling device again operates in the disengaged mode. In the disengaged mode, most of the fluid is in the reservoir chamber 33, and is not being "sheared" as it would be if it were in the operating chamber 31, and therefore, the fluid is not likely to be damaged as a result of the very high slip speed to which the coupling device is subjected. Furthermore, to the extent that the fluid may already be heated to a temperature somewhat beyond what is really desirable, operating in a disengaged mode, and pumping the fluid back into the reservoir chamber 33 provides the best opportunity for transferring heat away from the fluid, i.e., through the stamped metal cover 35 to the ram air flowing over the device.

Figure 5:
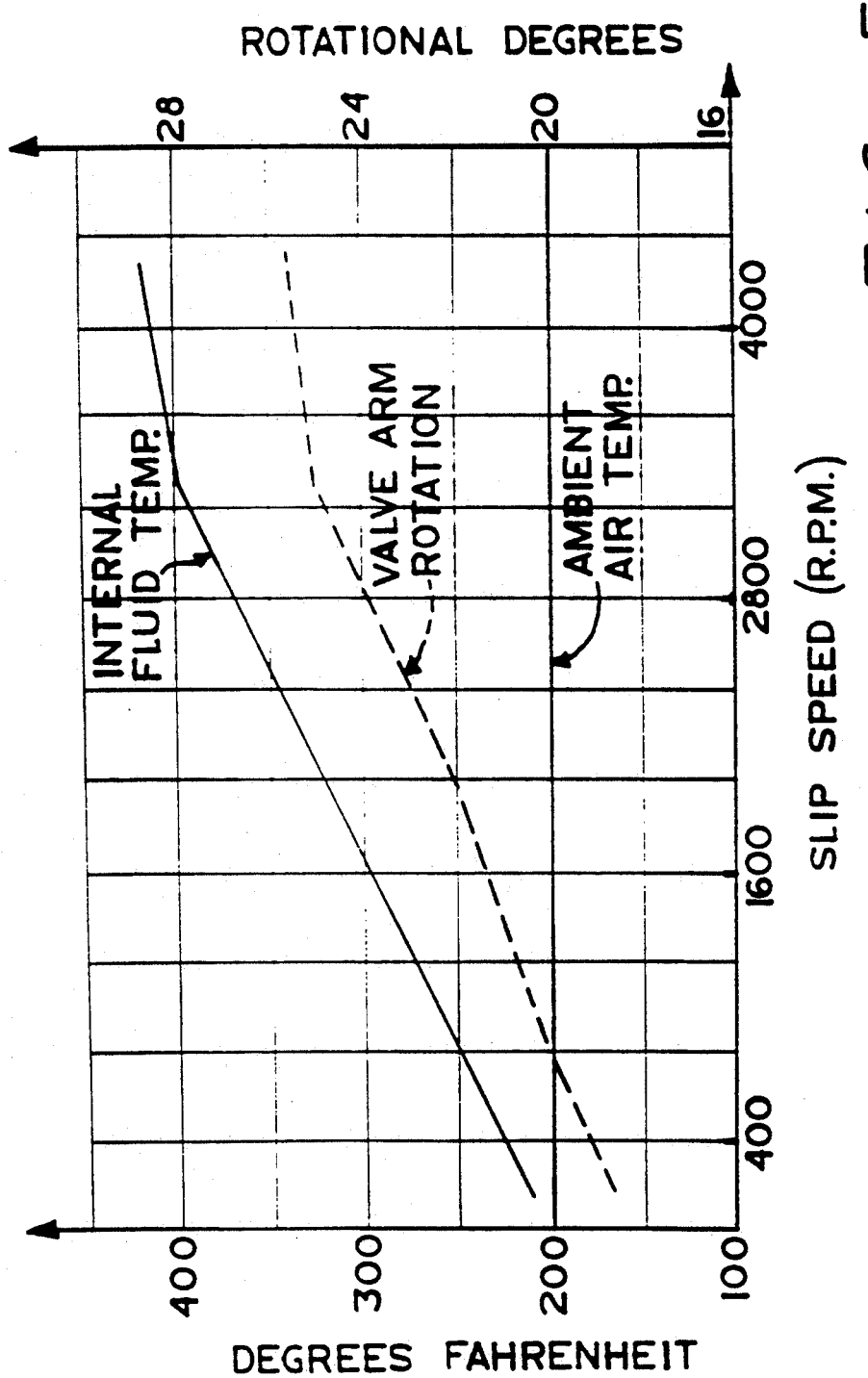
FIG. 5 is a graph of fluid temperature and rotary valve arm position versus slip speed, of a fluid coupling device including the present invention.

As was stated previously, one important aspect of the present invention is the recognition regarding the correlation between the internal fluid temperature and the rotation position of the valve arm 41 (i.e., the temperature of the bimetal coil 43). To illustrate this further, FIG. 5 is a graph on which the left ordinate is temperature in degrees Fahrenheit, and the right ordinate is rotational position of the valve arm 41 (in rotational degrees) from the cold stop 63. In performing the test which resulted in the graph of FIG. 5, the ambient temperature (i.e., the air temperature in front of the bimetal coil 43) was actively controlled at 200 degrees Fahrenheit. The internal fluid temperature within the operating chamber 31 was measured by means of a thermocouple inserted axially through the input shaft 17, then radially through the input coupling member 11. The rotary valve arm position was determined by means of markings on the cover 35 and the valve shaft 39, and by the use of a strobe light, as is well known to those skilled in the art. It may be seen in FIG. 5 that as the internal fluid temperature increased, the rotary position of the valve arm 41 increased generally proportionally. In the subject embodiment, and by way of example only, as the internal fluid temperature increased from 210 degrees Fahrenheit to 420 degrees Fahrenheit, the valve arm 41 rotated approximately seven degrees of rotation, an amount of valve arm rotation which would normally require an increase in ambient air temperature at the bimetal coil of approximately 60 degrees Fahrenheit. However, the movement of the bimetal coil 43 occurred, as did the resulting rotation of the valve arm, even though the ambient air temperature was kept constant.

It may be seen that the device of the present invention provides an improved fluid coupling device which is able to protect the viscous fluid, and thus the fluid coupling device itself, against overheating of the fluid when the device is subjected to excessive input speeds and slip speeds. Furthermore, in accordance with the invention, such protection is provided without the need for any additional parts or any substantial, additional manufacturing cost, or assembly and testing time and cost.

In the foregoing specification and in the drawings, the subject embodiment of the present invention has been illustrated in connection with a generally Y-shaped valve arm in which the fill opening 55 and discharge opening 51 are diametrically opposed. It should be apparent to those skilled in the art that, within the scope of the present invention, the valve arm 41 could have various shapes, other than a Y-shape. For example, the valve arm could be merely V-shaped, not including any diametrically opposite discharge covering portion. As another alternative, the fill opening and the discharge opening could be disposed in generally the same region of the valve plate 29, as has been done commercially for many years in the series 130 fluid coupling device of the assignee of the present invention. In that case, one of the inlet covering portions could also serve as the discharge covering portion, within the scope of the present invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. In a fluid coupling device of the type including a first rotatable coupling assembly defining an axis of rotation, enclosure means associated with said first coupling assembly to define a fluid chamber, valve means associated with said first coupling assembly and disposed to separate said fluid chamber into a fluid operating chamber and a fluid reservoir chamber; a second rotatable coupling member disposed in said fluid operating chamber, and being rotatable relative to said first coupling assembly, said first and second couplings cooperating to define a viscous shear space therebetween, said valve means being operable to control the flow of fluid between said reservoir chamber and said operating chamber, and including control means associated with said valve means to effect the operation thereof in response to variations in a predetermined temperature condition; means operable to pump fluid from said operating chamber, through a discharge opening, to said reservoir chamber in response to a difference in speed of rotation of said first and second couplings; said valve means including a plate-like member defining a fluid inlet, generally diametrically disposed relative to said discharge opening, a movable valve member operably associated with said control means, and comprising a generally flat member disposed to move in a plane generally parallel to said plate-like member, characterized by:

(a) said valve member including first and second circumferentially spaced-apart inlet covering portions, and a discharge covering portion;

(b) said valve member being configured such that:
(i) at a first temperature condition, flow through said fluid inlet is blocked by said first inlet covering portion, and flow through said discharge opening is permitted;
(ii) at a second relatively higher temperature condition, flow through said fluid inlet is permitted and flow through said discharge opening is blocked by said discharge covering portion; and
(iii) at a third temperature condition, higher than said second temperature, flow through said fluid inlet is blocked by said second inlet covering portion, and flow through said discharge opening is permitted.

2. A fluid coupling device as claimed in claim 1, characterized by said valve member comprising a generally Y-shaped member, including said first and said second inlet covering portions, with said discharge covering portion being disposed generally diametrically opposite said inlet covering portions.

3. A fluid coupling device as claimed in claim 1, characterized by said enclosure means comprising a relatively thin, stamped metal cover member, said cover member and plate-like member bounding said fluid reservoir chamber.

4. A fluid coupling device as claimed in claim 1, characterized by said first coupling assembly cooperating with said second coupling member to define a viscous shear space therebetween, said shear space being defined by a plurality of annular, interdigitated lands and grooves defined, alternately, by said first coupling assembly and said second coupling member.

5. In a fluid coupling device of the type including a first rotatable coupling assembly defining an axis of rotation, enclosure means associated with said first coupling assembly to define a fluid chamber, valve means associated with said first coupling assembly and disposed to separate said fluid chamber into a fluid operating chamber and a fluid reservoir chamber; a second rotatable coupling member disposed in said fluid operating chamber, and being rotatable relative to said first coupling assembly, said first and second couplings co-operating to define a viscous shear space therebetween, said valve means being operable to control the flow of fluid between said reservoir chamber and said operating chamber, and including control means associated with said valve means to effect the operation thereof in response to variations in a predetermined temperature condition; means operable to pump fluid from said operating chamber, through a discharge opening, to said reservoir chamber in response to a difference in speed of rotation of said first and second couplings; said valve means including a plate-like member defining a fluid inlet, generally diametrically disposed relative to said discharge opening, a movable valve member operably associated with said control means, and comprising a generally flat member disposed to move in a plane generally parallel to said plate-like member, characterized by:

(a) said valve member including first and second circumferentially spaced-apart inlet covering portions, and another portion oppositely disposed, about said axis of rotation, from said covering portions;
(b) said first and second inlet covering portions being configured such that as the temperature increases from a first, minimum temperature, the valve member moves from a first position in which said first inlet covering portion blocks flow through said fluid inlet toward a second position at a second relatively higher temperature in which said first and said second inlet covering portions are disposed on circumferentially opposite sides of said fluid inlet port, and as said temperature increases from said second temperature toward a third, maximum temperature, said valve member moves toward a third position in which said second inlet covering portion blocks fluid flow through said fluid inlet, whereby rotation of said fluid coupling device at said maximum temperature results in operation of said device in a disengaged condition.

6. A fluid coupling device as claimed in claim 5, characterized by said valve member including a discharge covering portion being configured such that:
(i) when said valve member is in said first position, flow is permitted through said discharge opening;
(ii) when said valve member is in said second position, flow through said discharge opening is blocked by said discharge covering portion; and
(iii) when said valve member is in said third position, flow through said discharge opening is again permitted.

* * * * *